United States Patent
Lee et al.

(10) Patent No.: US 7,656,494 B2
(45) Date of Patent: Feb. 2, 2010

(54) DISPLAY DEVICE

(75) Inventors: Dong-yub Lee, Siheung-si (KR);
Soong-yong Joo, Seongnam-si (KR);
Jung-sun Lee, Gwangju-si (KR); Suk-ki Jung, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 178 days.

(21) Appl. No.: 12/019,542

(22) Filed: Jan. 24, 2008

(65) Prior Publication Data

US 2008/0180626 A1  Jul. 31, 2008

(30) Foreign Application Priority Data

Jan. 26, 2007  (KR)  ............... 10-2007-0008392

(51) Int. Cl.
G02F 1/1343  (2006.01)
G02F 1/136  (2006.01)
G02F 1/1345  (2006.01)

(52) U.S. Cl. .................. 349/151; 349/43; 349/149; 349/150; 349/152

(58) Field of Classification Search ............ None
See application file for complete search history.

(56) References Cited

U.S. PATENT DOCUMENTS 6,211,935 B1 * 4/2001 Yamada ............ 349/149
7,253,868 B2 * 8/2007 Lee et al. ............ 349/155
2005/0012873 A1 * 1/2005 Park et al. ............ 349/43
2006/0012745 A1 * 1/2006 Kobayashi et al. ......... 349/152
2006/0164586 A1 * 7/2006 Yamada ............ 349/149

FOREIGN PATENT DOCUMENTS

JP  3756418  9/2002
KR  2000-0074550  12/2000
KR  2002-0021511  3/2002

OTHER PUBLICATIONS

English Language Abstract, Publication No. JP2002258311, Sep. 11, 2002, 1 p.
Korean Patent Abstracts, Publication No. 1020000074550, Dec. 15, 2000, 1 p.
Korean Patent Abstracts, Publication No. 1020020021511, Mar. 21, 2002, 1 p.

* cited by examiner

*Primary Examiner*—Tina M Wong
(74) *Attorney, Agent, or Firm*—Innovation Counsel LLP

(57) ABSTRACT

A display device in which a driving chip is attached to a display panel by using an anisotropic conductive film to from a strong adhesive bond between the body of the driving chip and the display panel and to electrically connect contact terminals on the driving chip with contact pads on the display panel.

21 Claims, 4 Drawing Sheets

DISPLAY DEVICE

CROSS-REFERENCE TO RELATED APPLICATIONS

This application claims the benefit of priority of Korean Patent Application No. 10-2007-0008392, filed on Jan. 26, 2007 in the Korean Intellectual Property Office, the disclosure of which is incorporated herein by reference.

BACKGROUND OF INVENTION

1. Field of Invention

The present invention relates to a display device, and more particularly, to the attachment of a driving integrated circuit chip to a display panel.

2. Description of the Related Art

Display devices utilizing various types of display panels are currently available. As the semiconductor and thin film technologies for making liquid crystal display (LCD) panels have been developed, small and lightweight panels with improved performance have become available. A display device provided with the liquid crystal display (LCD) panel is taken herein as representative of the various display devices.

A display device having a liquid crystal display panel has the advantages of miniaturization, such as light weight and reduced power consumption and therefore has become popular as a substitute for cathode ray tubes (CRT) Currently, liquid crystal display panels are used in large-sized products such as monitors and televisions and in small-sized products such as mobile phones, personal digital assistants (PDA) and portable multimedia players (PMP), and in all other information processing devices where a display device is required.

A display device intended to be used in small-sized products generally includes a driving integrated circuit chip that is directly mounted onto an area adjoining the edge of the display panel.

However, in the conventional display device a problem exists in that the driving integrated circuit chip, mounted on the display panel, may separate from the display panel due to external impact and cause the display device to fail. Thus, because the driving integrated circuit chip is not firmly mounted on the display panel, the durability of the display device is decreased.

SUMMARY OF THE INVENTION

Accordingly, the present invention provides a display device having a mounting arrangement for an integrated circuit driving chip that provides a reduced failure rate and improved durability.

Additional aspects of the present invention will be set forth in part in the description which follows and, in part, will be obvious from the description, or may be learned by practice of the present invention.

The foregoing and other aspects of the present invention can be achieved by providing a display device comprising: a display panel comprising a first display substrate and a second display substrate, the first display substrate comprising a mounting region; a plurality of contact pads formed on the first display substrate in the mounting region; a plurality of thin film wiring lines extending from the contact pads; a protection layer formed on the mounting region; a plurality of contact holes formed in the protection layer exposing the contact pads; an adhesive hole formed in the protection layer and exposing a portion of the first display substrate in the mounting region; an anisotropic conductive film (ACF) provided in the adhesive hole and in the contact holes; and a driving integrated circuit chip attached to the anisotropic conductive film (ACF) in the adhesive hole and to the anisotropic conductive film (ACF) in the contact holes, the driving integrated circuit chip being electrically connected to the contacts on the first display substrate by the anisotropic conductive film (ACF).

According to the embodiment of the present invention, the driving integrated circuit chip comprises a circuit chip main body, and a plurality of connection terminals for electrically connecting the driving integrated circuit chip to the contact pads.

According to the embodiment of the present invention the display device further comprises a neighbor region surrounding the mounting region and wherein the protection layer is formed on the neighbor region.

According to the embodiment of the present invention, the anisotropic conductive film (ACF) electrically connects the contact pads to the connection terminals of the driving integrated circuit chip through the contact holes in the protection layer, and the anisotropic conductive film (ACF) adheres to the portion of the first display substrate exposed by the adhesive hole and adheres to circuit chip main body of the driving integrated circuit chip.

According to the embodiment of the present invention, the adhesive force between the anisotropic conductive film (ACF) and the first display substrate is stronger than the adhesive force between the protection layer and the first display substrate.

According to the embodiment of the present invention, the adhesive hole in the protection layer does not overlap the contact pads or the thin film wiring lines.

According to the embodiment of the present invention, the anisotropic conductive film (ACF) comprises an adhesive layer and a plurality of conductive balls mixed in the adhesive layer.

According to the embodiment of the present invention, the protection layer includes organic material.

According to the embodiment of the present invention, the first display substrate is transparent and includes at least one of the materials in the group consisting of glass, quartz, ceramic and plastic.

According to the embodiment of the present invention, the second display substrate is smaller than the first display substrate and is disposed opposite the first display substrate; and the mounting region and the neighbor region are located near the edge of the first display substrate and are not overlapped by the second display substrate.

BRIEF DESCRIPTION OF THE DRAWINGS

The above and other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Figure 1:
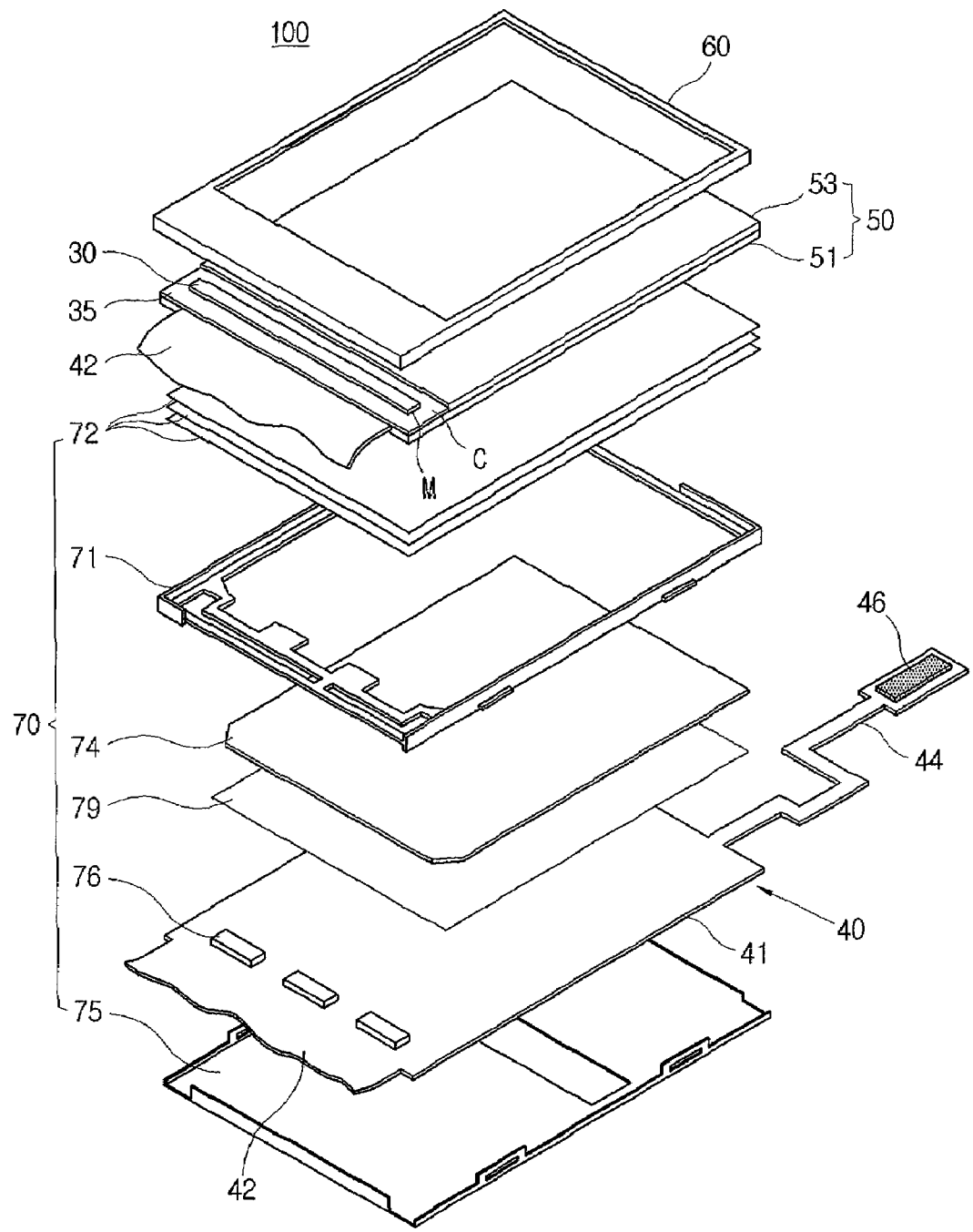
FIG. 1 is an exploded perspective view of a display device according to an exemplary embodiment of the present invention.

Reference will now be made in detail to the embodiments of the present invention, examples of which are illustrated in the accompanying drawings, wherein like reference numerals refer to like elements throughout.

According to the figures, a display panel used in a display device is embodied by an LCD panel. However, the display panel according to the present invention is not limited to the LCD panel but may also be other kinds of display panel known in the art besides the LCD panel.

Also, according to the figures, a small-sized display panel employed, for example, in a cellular phone or a personal digital assistant is illustrated by way of example. However, the present invention is not limited to such a small-sized display device, and may be applied to display devices of various sizes.

Further, in the following descriptions, like reference numerals refer to like elements throughout.

As shown FIG. 1, a display device 100 according to an exemplary embodiment of the present invention includes a display panel 50 for displaying images. The display panel 50 includes a first display substrate 51 and a second display substrate 53. The first display substrate comprises a mounting region M surrounded by a neighbor region C. A driving integrated circuit chip 30 is mounted on the mounting region M on the first display substrate 51 of the display panel 50. A protection layer 35 is provide to cover the mounting region M and neighbor region C.

The display device 100 further includes a backlight assembly 70 which provides light to the display panel 50; an accommodating member 75 which accommodates the display panel 50, and the backlight assembly 70; and a cover member 60 which is coupled with the accommodating member 75 and fastens the display panel 50 on the backlight assembly 70.

The display device 100 further includes a flexible printed circuit board (FPCB) 40 which is electrically connected to the display panel 50 and provides a driving signal.

The FPCB 40 includes a circuit board main body 41, a link unit 42, and a connector unit 44. The circuit board main body 41 includes various circuit elements mounted thereon and provides a driving signal to the display panel 50. The link unit 42 is extended from one side of the circuit board main body 41 and electronically connects the circuit board main body 41 and the display panel 50. A connector 46 is formed at the end of the connector unit 44. The FPBC 40 receives a signal indicating that a foldable cellular phone is open and receives other signal information through the connector 46.

The backlight assembly 70 includes a light guiding plate 74, a light source unit 76, a reflecting member 79, an optical sheet 72, and a supporting member 71.

The light guiding plate 74 is disposed opposite a rear part of the display panel 50. The light guiding plate 74 guides the light emitted from the light source unit 76 and substantially uniformly transmits the light to the rear part of the display panel 50. That is, the light guiding plate 74 receives the light through an incident surface facing the light source unit 76 and emits the light from an emitting surface facing the display panel 50.

The light source unit 76 is disposed on one side edge of the light guiding plate 74 and is disposed to face the incident surface of the light guiding plate 74. The light source unit 76 may include a plurality of light emitting diodes (LEDs). In FIG. 1, the plurality of LEDs directly mounted on the FPCB 40 is employed as the light source unit 76. The light source unit 76 directly receives power from the FPCB 40.

The present invention is not limited to this exemplary embodiment. Alternatively, the light source unit 76 may include a separate substrate for a light source and a plurality of light emitting diodes (LEDs) may be mounted on the separate substrate.

In FIG. 1, three LEDs are used for the light source unit 76, but the number of LEDs may be as many as necessary.

The reflecting member 79 is disposed at the rear part of the light guiding plate 74 to face the surface of the light guiding plate that is opposite the emitting surface. The reflecting member 79 reflects the light, which is incident from the light source unit 76 to the light guiding plate 74 and the light guiding plate 74 emits the light toward the rear part of the display panel 50. Accordingly, the reflecting member 79 reduces loss of the light and helps the light to be diffused in the light guiding plate 74.

The optical sheet 72 is disposed on the emitting surface of the light guiding plate 74 and between the light guiding plate 74 and the display panel 50. The optical sheet 72 further diffuses the light from the light guiding plate 74 before it enters the display panel 50 and it also enhances brightness.

The supporting member 71 supports the light guiding plate 74, the light source unit 76, and the optical sheet 72. Also, the supporting member 71 supports the edge of the display panel 50.

The accommodating member 75 is coupled with the supporting member 71 and the cover member 60. The accommodating member 75 accommodates the light guiding plate 74, the light source unit 76, the optical sheet 72, the reflecting member 79, the supporting member 71, and the display panel 50. Also, the accommodating member 75 accommodates the FPCB 40.

The present invention is not limited to this exemplary embodiment. Alternatively, the FPBC 40 may be installed at the rear side of the accommodating member 75 rather than being accommodated in the accommodating member 75.

The display panel 50 includes a first display substrate 51, a second display substrate 53 disposed opposite the first display substrate 51, and a liquid crystal layer (not shown) disposed between the first display substrate 51 and the second display substrate 53. The first display substrate 51 is used as a rear substrate and the second display substrate 53 is used as a front substrate. The second display substrate 53 is smaller than the first display substrate 51.

The display panel 50 has the mounting region M and the neighbor region C surrounding the mounting region M. The mounting region M and the neighbor region C are regions of the first display substrate 51 and are located near the edge of the first display substrate 51. The mounting region M and the neighbor region C are not overlapped by the second display substrate 53. The driving integrated circuit chip 30 is mounted on the mounting region M. The protection layer 35 is applied to the mounting region M and to the neighbor region C.

Also, the link unit 42 of the FPCB 40 is electrically connected to the first display substrate 51 near to the mounting region M and the driving integrated circuit chip 30.

The display panel 50 displays an image through a plurality of pixels, a pixel being the smallest element in a displayed image. The first display substrate 51 includes a plurality of thin film transistors (TFT) used as switching elements and a plurality of pixel electrodes connected with the TFTs. The second display substrate 53 includes a common electrode. A color filter is formed on either the first display substrate 51 or the second display substrate 53. The liquid crystal layer is disposed between the pixel electrodes of the first display substrate 51 and the common electrode of the second display substrate 53.

With this configuration, if a thin film transistor is turned on, an electric field is formed between the pixel electrode and the common electrode. By this electric field, a liquid crystal arrangement of the liquid crystal layer (not shown) disposed between the first display substrate 51 and the second display substrate 53 is changed, and accordingly the light transmissivity in each pixel is changed in the display panel 50. Thus, the display panel 50 adjusts the transmissivity of the light from the backlight assembly 70 to thereby obtain a predetermined image.

Also, polarization plates (not shown) are attached to a front surface of the second display substrate 53 and a rear surface of the first display substrate 51 to linearly polarize visible light supplied from the backlight assembly 70.

Figure 2:
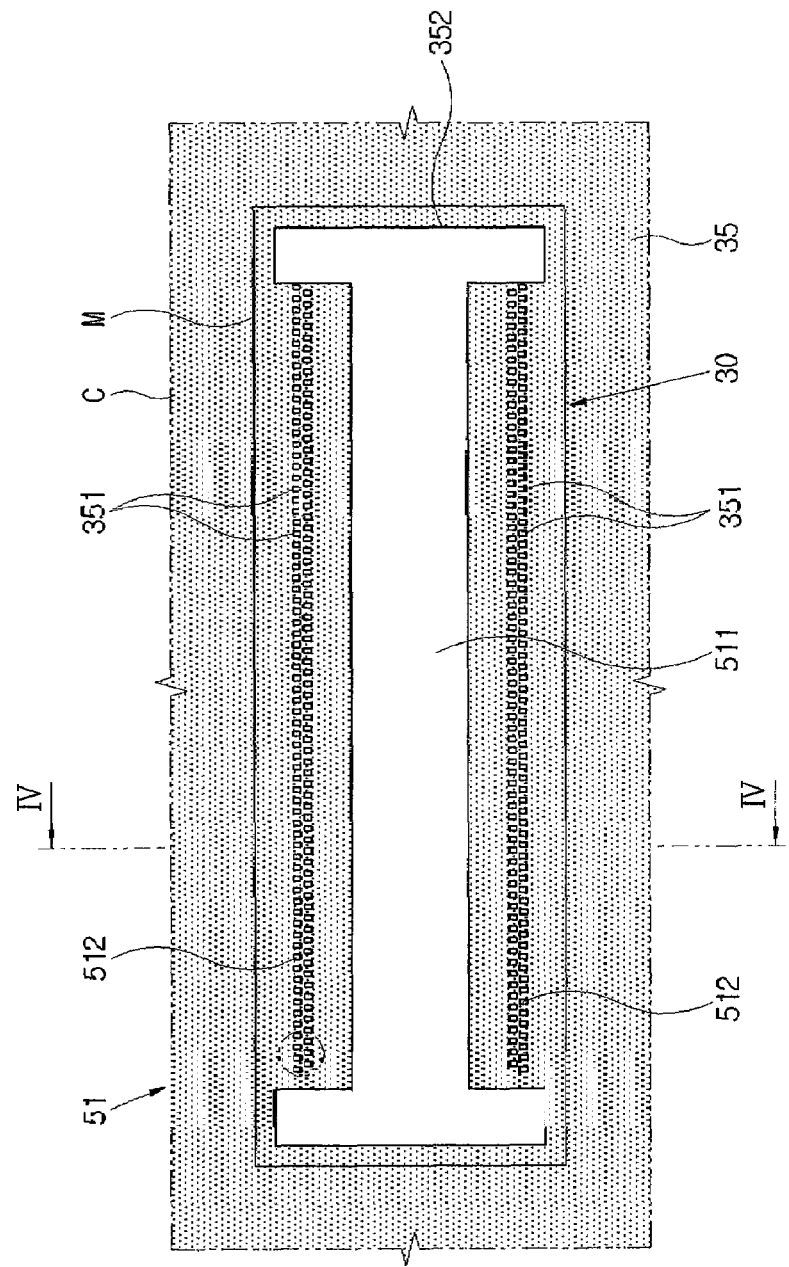
FIG. 2 is a plan view of a mounting region on which a driving integrated circuit chip is mounted.

FIG. 2 is a plan view illustrating the mounting region M and the neighbor region C of the first display substrate 51.

As shown in FIG. 2, the first display substrate 51 includes the mounting region M and the neighbor region C. The first display substrate 51 includes a substrate member 511 which includes an area of the first display substrate that includes the mounting region M and the neighbor region C. A plurality of contact pads 512 for contacting the driving integrated circuit chip 30 is formed on the first display substrate 51 in the mounting region M. A plurality of thin film wiring lines 513 (see FIG. 3) extend from the contact pads 512.

Contact holes 351, formed in the protection layer 35, expose the contact pads 512. An adhesive hole 352, formed in the protection layer 35 exposes a portion of the first display substrate 51 in the mounting region M. The adhesive hole 352 does not overlap the contact pads 512 or the thin film wiring lines 513. In FIG. 2, the area marked by dots denotes an area that is covered by the protection layer 35.

The protection layer 35 may include organic material. The protection layer 35 covers and protects conductive films such as the thin film wiring lines 513 formed on the first display substrate 51. Thus, the thin film wiring lines 513 may be prevented from being corroded or short-circuited.

Figure 3:
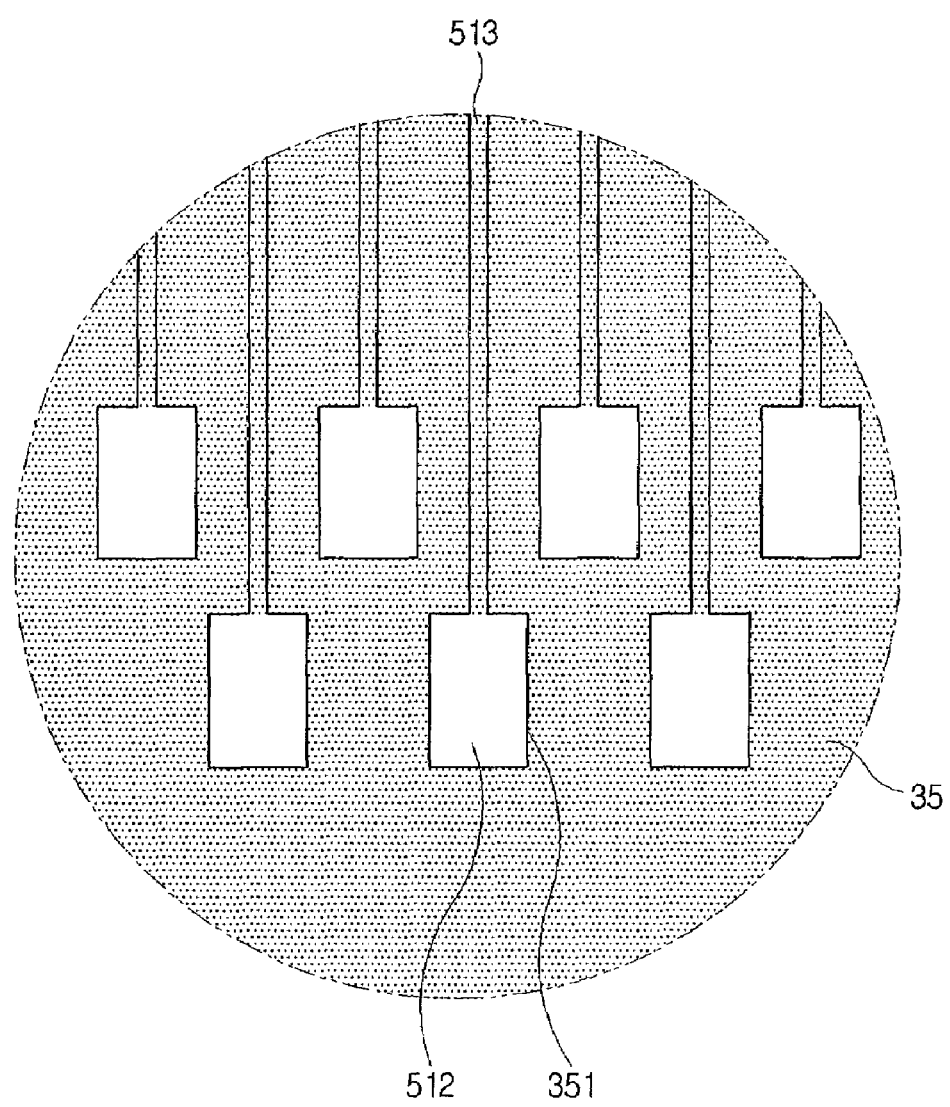
FIG. 3 is an enlarged plan view of a portion of the mounting region containing contact pads.

FIG. 3 is an expanded plan view of a portion of the mounting region containing contact pads and thin film wiring lines. As shown FIG. 3, the protection layer 35 exposes the contact pads 512 through the contact holes 351 but covers the thin film wiring lines 513 extending from the contact pads 512.

Figure 4:
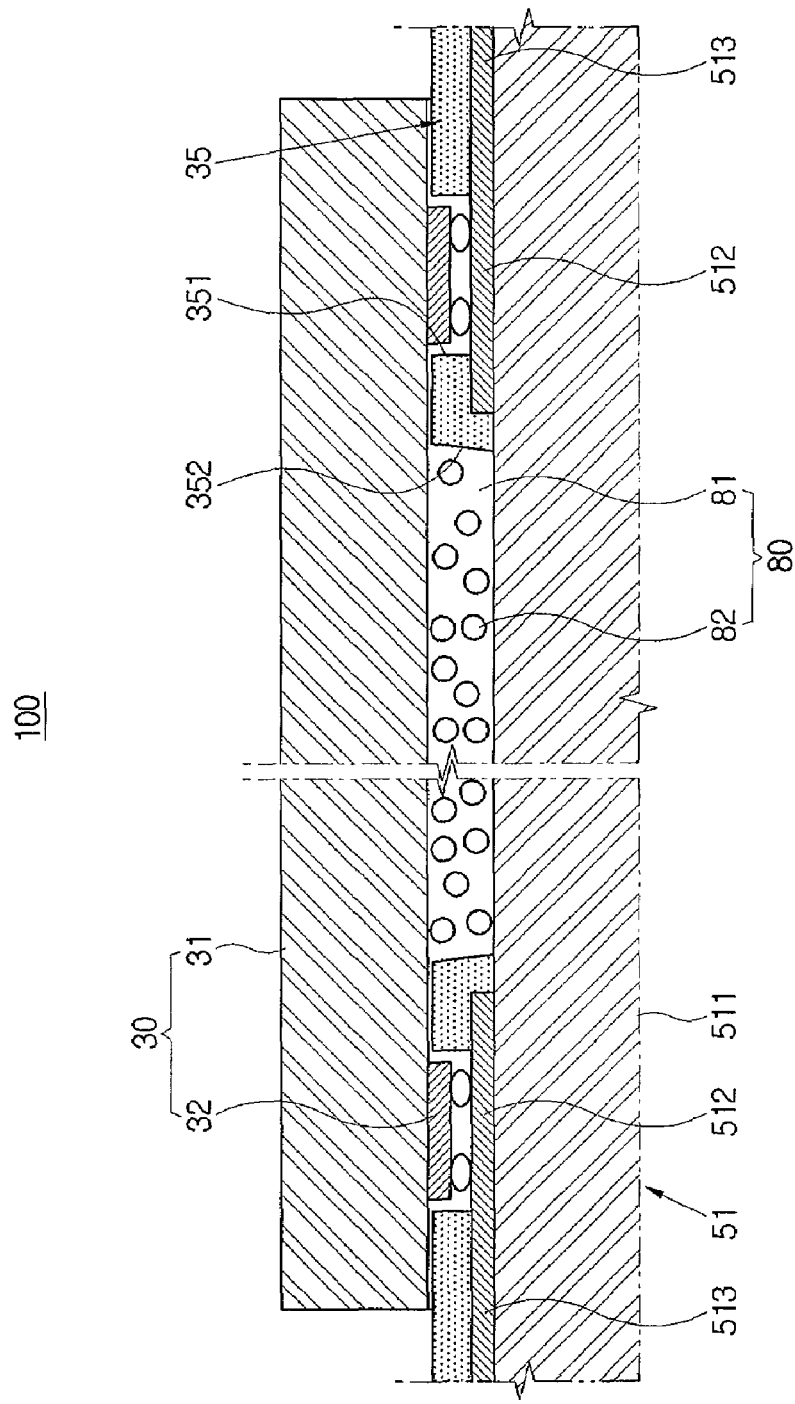
FIG. 4 is a sectional view taken along line IV-IV in FIG. 2.

FIG. 4 shows a sectional view taken along line IV-IV in FIG. 2.

As shown FIG. 4, the driving integrated circuit chip 30 includes a circuit chip main body 31 and connection terminals 32 for electrically connecting the driving integrated circuit chip 30 to the contact pads 512. Accordingly, the connection terminals 32 of the driving integrated circuit chip 30 are disposed to correspond to the locations of the contact pads 512 formed on the first display substrate 51.

Also, the display device 100 further includes an anisotropic conductive film (ACF) 80 for mounting the driving integrated circuit chip 30 on the mounting region M. The ACF 80 includes an adhesive layer 81 and conductive balls 82 mixed in the adhesive layer 81.

The ACF 80 electrically connects the contact pads 512 to the connection terminals 32 of the driving integrated circuit chip 30 through the contact holes 351. The conductive balls 82 of the ACF 80 electrically connect the connection terminals 32 to the contact pads 512. The conductive balls 82 have a diameter that is greater than the thickness of the protective layer 35.

The ACF 80 adheres to the portion of the first display substrate 51 that is exposed by the adhesive hole 352 and adheres to the circuit chip main body 31 of the driving integrated circuit chip 30. Thus, the adhesive layer 81 of the ACF 80 forms an adhesive bond between the first display substrate 51 and the circuit chip main body 31.

In addition, the contact pads 512 exposed through the contact holes 351 and first display substrate 51 exposed through the adhesive hole 352 are covered again by the ACF 80.

Herein, the adhesive force between the ACF 80 and the first display substrate 51 is stronger than the adhesive force between the protection layer 35 and the first display substrate 51. That is, the adhesive force between ACF 80 and substrate member (glass or other) is stated to be greater than the adhesive force between a protective layer 35 containing organic material and the substrate member. The first display substrate 51 is transparent and is made of at least one of the group consisting of glass, quartz, ceramic and plastic. The adhesive force between the protection layer 35, made of organic material, and the first display substrate 51 is weaker than that between the ACF 80 and the first display substrate 51.

In the case where the circuit chip main body of the driving integrated circuit chip is adhered to the protection layer formed on the first display substrate, the driving integrated circuit chip may separate from the first display substrate if the protection layer is separated from the first display substrate by an external mechanical shock. This is because the adhesive force between the protection layer and the first display substrate is relatively weak. Accordingly, connection failure may occur between the connection terminals of the driving integrated circuit chip and the contact pads of the first display substrate.

However, in the display device 100 according to the exemplary embodiment of the present invention, the circuit chip main body 31 of the driving integrated circuit chip 30 is adhered to the ACF 80 which also adheres to the first display substrate 51 exposed through the adhesive hole 352. The adhesive force between the ACF 80 and the first display substrate 51 is stronger than the adhesive force between the protection layer 35 and the first display substrate 51 so that the driving integrated circuit chip 30 can be effectively prevented from coming off the first display substrate 51 even though the strength of the external mechanical shock is such that the protection layer 35 would come off the first display substrate 51.

As described above, the driving integrated circuit chip 30 is firmly and stably mounted on the display panel 50. Accordingly, the durability of the display device is improved. Also, the failure rate of the display device 100 is decreased. Further, problems owing to a defective mount of the driving integrated circuit chip are effectively prevented.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display device comprising:
a display panel comprising a first display substrate and a second display substrate, the first display substrate comprising a mounting region;
a plurality of contact pads formed on the mounting region;
a protection layer formed on the mounting region;
a plurality of contact holes formed in the protection layer and exposing the contact pads;

an adhesive hole formed in the protection layer and exposing a portion of the first display substrate in the mounting region; and a driving integrated circuit chip formed on the mounting region, the driving integrated circuit chip being electrically connected to the plurality of contact pad.

2. The display device according to claim 1, further comprising an anisotropic conductive film (ACF) provided in the adhesive hole and in the contact holes, the driving integrated circuit chip attached to the anisotropic conductive film (ACF) in the adhesive hole and in the contact holes, and the driving integrated circuit chip being electrically connected by the anisotropic conductive film (ACF).

3. The display device according to claim 2, wherein the first display substrate further comprises a plurality of thin film wiring lines formed on the first display substrate and extending from the contacts, and a neighbor region, wherein the neighbor region surrounds the mounting region and wherein the protection layer formed on the mounting region is also formed on the neighbor region.

4. The display device according to claim 2, wherein the driving integrated circuit chip comprises a circuit chip main body and a plurality of connection terminals for electrically connecting the driving integrated circuit chip to the contact pads.

5. The display device according to claim 3, wherein the anisotropic conductive film (ACF) electrically connects the contact pads of the display panel and the connection terminals of the driving integrated circuit chip through the contact holes of the protection layer, and wherein the anisotropic conductive film adheres to the portion of the first display substrate exposed by the adhesive hole and adheres to the circuit chip main body of the driving integrated circuit chip.

6. The display device according to claim 5, wherein the adhesive force between the anisotropic conductive film (ACF) and the first display substrate is stronger than the adhesive force between the protection layer and the first display substrate.

7. The display device according to claim 5, wherein the adhesive hole does not overlap the contact pads or the thin film wiring lines.

8. The display device according to claim 7, wherein the anisotropic conductive film (ACF) comprises an adhesive layer and conductive balls mixed in the adhesive layer.

9. The display device according to claim 7, wherein the protection layer includes organic material.

10. The display device according to claim 7, wherein the first display substrate is transparent and includes at least one member of the group consisting of glass, quartz, ceramic and plastic.

11. The display device according to claim 7, wherein the second display substrate is smaller than the first display substrate and is disposed opposite the first display substrate; and the mounting region and the neighbor region are formed near the edge of the first display substrate and are not overlapped by the second display substrate.

12. The display device according to claim 4, wherein the adhesive hole does not overlap the contact pads or the thin film wiring lines.

13. The display device according to claim 12, wherein the anisotropic conductive film (ACF) comprises an adhesive layer and conductive balls mixed in the adhesive layer.

14. The display device according to claim 12, wherein the protection layer includes organic material.

15. The display device according to claim 12, wherein the first display substrate is transparent and includes at least one member of the group consisting of glass, quartz, ceramic and plastic.

16. The display device according to claim 12, wherein the second display substrate is smaller than the first display substrate and is disposed opposite the first display substrate; and the mounting region and the neighbor region are formed near the edge of the first display substrate and are not overlapped by the second display substrate.

17. The display device according to claim 3, wherein the adhesive hole does not overlap the contact pads or the thin film wiring lines.

18. The display device according to claim 17, wherein the anisotropic conductive film (ACF) comprises an adhesive layer and conductive balls mixed in the adhesive layer.

19. The display device according to claim 17, wherein the protection layer includes organic material.

20. The display device according to claim 17, wherein the first display substrate is transparent and includes at least one member of the group consisting of glass, quartz, ceramic and plastic to be transparent.

21. The display device according to claim 17, wherein the second display substrate is smaller than the first display substrate and is disposed opposite the first display substrate; and the mounting region and the neighbor region are formed near the edge of the first display substrate and are not overlapped by the second display substrate.

\* \* \* \* \*